Patented Mar. 7, 1939

2,150,093

UNITED STATES PATENT OFFICE 2,150,093

DYESTUFFS OF THE ANTHRAQUINONE SERIES

Earl E. Beard, South Milwaukee, and Melvin A. Perkins, Milwaukee, Wis., assignors to E. I. du Pont de Nemours & Company, Wilmington, Del., a corporation of Delaware No Drawing. Application April 22, 1937, Serial No. 138,376

2 Claims. (Cl. 260—303)

This invention relates to the preparation of dye-stuffs of the anthraquinone series and has for its object to provide new and desirable olive dyestuffs which may be employed for printing and dyeing and which exhibit excellent fastness properties.

We have found that new and valuable dyestuffs may be prepared by condensing Bzl-halogen benzanthrone or 6-Bzl-dihalogen benzanthrone with a C(1'-aminoanthraquinonyl-6')-1,2(N)-anthraquinonethiazole of the formula

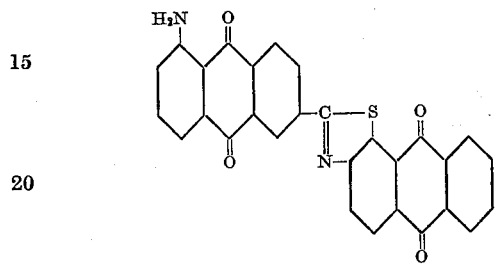

and

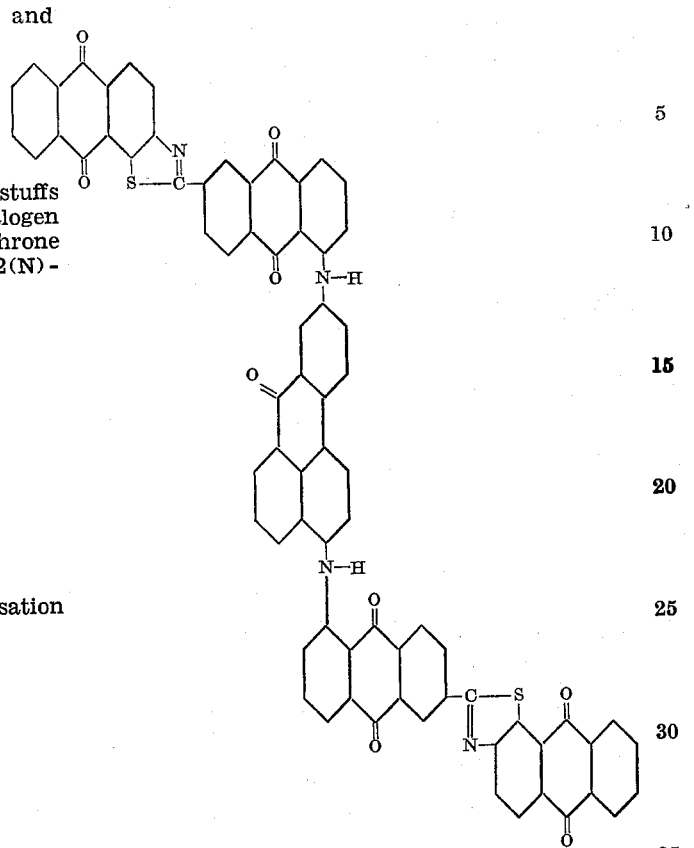

and then subjecting the resulting condensation products of the formula

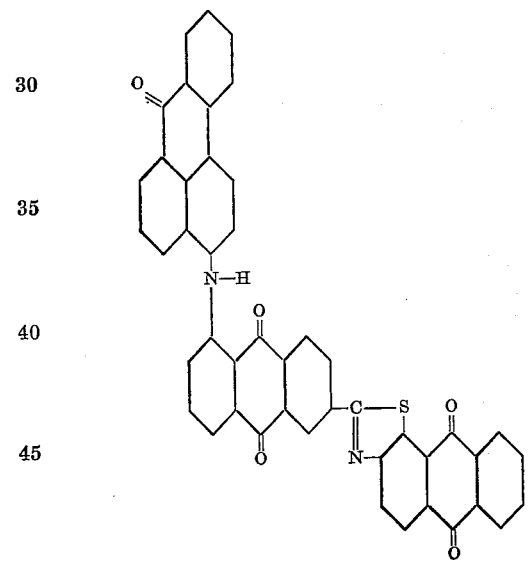

to an alcoholic-alkaline condensation to effect what is believed to be a ringclosure of the Bzl-benzanthrone imide group to give compounds generally considered to be of the benzanthrone-acridine series. The products are then reprecipitated from cold sulfuric acid.

While the condensation of a Bzl-halogen benzanthrone with aminoanthraquinones broadly considered is a known reaction, it has been found that new and desirable olive dyestuffs can be obtained by employing in this reaction the particular 1-amino-anthraquinone-6-anthraquinonethiazole illustrated by the formula above. These new colors are useful for textile printing as well as for dyeing. The 1-aminoanthraquinone-6-C linkage not heretofore used in this class of dyes has been found to impart to these dyestuffs excellent printing properties.

The following examples are given to illustrate the invention. The parts used are by weight.

*Example 1*

8 parts of C(1'-aminoanthraquinonyl-6')-1,2(N)-anthraquinonethiazole, 5.2 parts of Bzl-bromobenzanthrone, 2 parts of anhydrous sodium acetate and 0.5 part of copper acetate are heated together in 120 parts of nitrobenzene at gentle boil (200–206° C.) with good agitation, for 12 hours. The reaction is then cooled to 80° C., diluted with about 30 parts of solvent naphtha and filtered. The final product is washed with nitrobenzene, solvent naphtha, alcohol, and water, in turns, and dried. The benzanthrone imide compound thus obtained is a very dark brown colored powder which produces a yellow-brown solution color in sulfuric acid.

1 part of this benzanthrone imide is slowly added to a melt consisting of 3 parts of ethyl alcohol and 3 parts of potassium hydroxide held at 115–120° C. After 1 to 1½ hours at 115–120° C. the violet-black fusion mass is drowned in cold water to give a KOH concentration of approximately 5%. The aqueous slurry is then heated and aerated, and the completely precipitated dyestuff is filtered, washed alkali-free and dried.

This product produces a violet-black colored alkaline hydrosulphite vat and a yellowish green sulphuric acid solution color.

1 part of this product is agitated at room temperature in 20 parts of 98% sulphuric acid until no further change is noticed in the color of the solution (about 20 hours). The original yellow-green changes during this time to an intense blue-green color. The dyestuff is then drowned in cold water, filtered, and the cake is washed acid free with water. The finished product produces a violet-black colored alkaline hydrosulphite vat and may be employed to dye or print cotton in olive-green shades.

*Example 2*

10 parts of C(1'-aminoanthraquinonyl-6')-1,2(N)-anthraquinonethiazole, 4.1 parts of 6-Bzl-dibromobenzanthrone, 2 parts of sodium acetate and 0.5 part of copper acetate are condensed in 120 parts of nitrobenzene according to the method described in Example 1. The reaction product is isolated as a dark brown powder which produces a brown sulfuric acid solution color. This product fused in alcoholic caustic during 1 hour, according to the method described in Example 1, yields a product which gives a violet-black vat solution color and an olive-green sulfuric acid solution color. The product treated in 98% sulfuric acid, as described in Example 1, yields a dull olive colored paste which dyes and prints cotton in olive shades from a dull violet-black colored alkaline hydrosulfite vat.

The condensation of the Bzl-halogen or 6-Bzl-dihalogen benzanthrone with the aminoanthraquinone compound may be carried out in other solvents than the nitrobenzene employed in the specific examples, such as, for instance, in naphthalene, the chlorobenzenes, nitrotoluene, nitronaphthalenes, etc. Other acid binding agents, such as the carbonates and bicarbonates, may be used and other copper salts as well as free copper may be employed as a catalyst for the reaction.

The C(1'-aminoanthraquinonyl-6')-1,2(N)-anthraquinonethiazole employed in the preparation of these colors may be prepared, for example, by heating 1-nitroanthraquinone-6-carbonyl chloride with 1-mercapto-2-aminoanthraquinone in an inert organic solvent at 150–225° C., as more fully described in copending application 729,441, then reducing the free nitro group to the amine with sodium sulfhydrate, sodium hydrosulfite, etc. (see copending application 11,964).

We claim:

1. The compounds obtained by the alcoholic alkali condensation of the benzanthrone imides of the class consisting of those having the formula

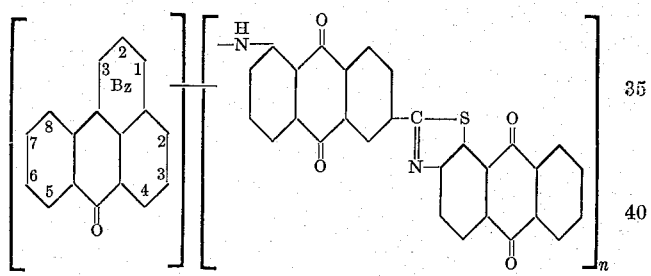

wherein $n$ stands for one of the whole numbers one and two, and wherein one iminoanthraquinonyl-1,2(N)-anthraquinonethiazole is attached to the benzanthrone nucleus in the Bzl-position and when a second imino group is present it is attached in the 6-position of the benzanthrone nucleus.

2. The compound obtained by the alcoholic alkali condensation of the benzanthrone imide of the formula

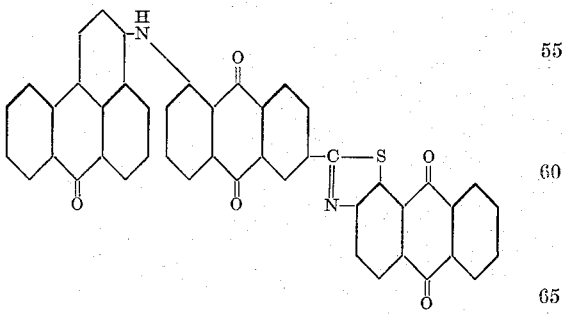

followed by reprecipitation from cold concentrated sulfuric acid.

EARL E. BEARD.
MELVIN A. PERKINS.